United States Patent Office 3,390,154
Patented June 25, 1968

3,390,154
PROCESS FOR PREPARING 3-INDOLYL ACETIC ACIDS
George Gal, Summit, N.J., assignor to Merck & Co., Inc., Rahway, N.J., a corporation of New Jersey
No Drawing. Filed Sept. 9, 1966, Ser. No. 578,150
5 Claims. (Cl. 260—326.13)

This invention relates to a process for preparing 1-p-chlorobenzoyl - 2-methyl-5-methoxy-(or dimethylamino)-3-indolyl acetic acids.

The indole compounds of this invention have a high degree of anti-inflammatory activity and are useful in the treatment of arthritis and like conditions, which are responsive to treatment with anti-inflammatory agents.

In the past these compounds have been prepared by acylation of an α-3-indolyl acetic acid ester by reaction with a strong base, such as sodium hydride, to form an N-sodium salt, followed by reaction with an aroyl halide. Under the conditions of acylation, the acid side-chain required protection to avoid acylation of the acid side-chain also. To afford this protection, the 3-indolyl acetic acid was esterified prior to acylation. After acylation, the desired acid compound was formed by diesterification of the corresponding ester.

We have found a novel process for preparing the above-mentioned 3-indolyl acetic acids which comprises reducing a 3-indolyl glyoxalate or glyoxalic acid to form a 3-indoline glycollic acid or ester, acylating the glycollic acid compound and finally heating the N-1 acyl compound in the presence of an acid to form the desired 3-indolyl acetic acid compounds. This process has several advantages over the previously-known process in that the acylation step is carried out on an indoline compound and, therefore, there is no need to use a strong base, such as sodium hydride, to activate the N-1-nitrogen; further, the acylation may be carried out directly on the 3-indoline acetic acid compound without prior protection of the acid side-chain.

The process of this invention may be described by the following flow sheet:

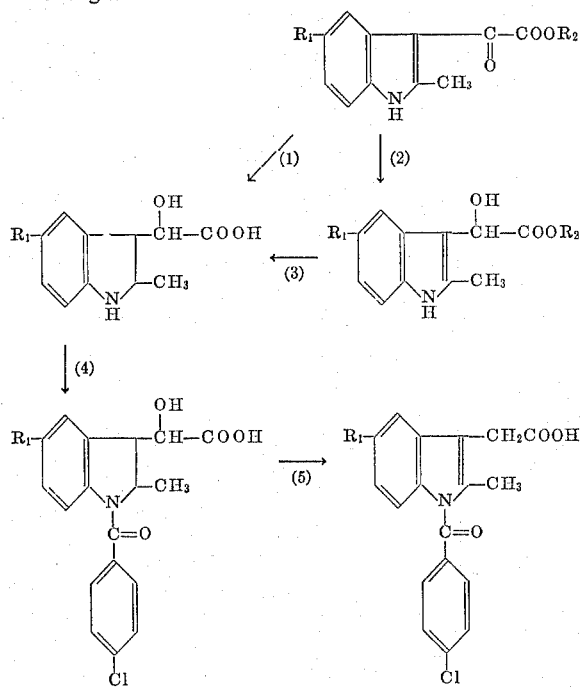

wherein:
$R_1$ may be methoxy or dimethylamino; and
$R_2$ may be an organic radical from 1 to 10 carbon atoms, preferably lower alkyl, or hydrogen.

The starting material for this process (2-methyl-5-methoxy) or (dimethylamino-3-indolyl) glyoxalic acid or ester), may be prepared by first reacting the corresponding N-1-unsubstituted indole with oxalyl chloride with subsequent addition of an alcohol to form the 3-indolyl glyoxalate, or addition of water to form the 3-indolyl glyoxalic acid compound. The glyoxalate or preferably the glyoxalic starting material may be either reduced with Raney nickel directly to the 3-indoline glycollic acid, or stepwise by first reducing with palladium or aluminum amalgam to form the 3-indole glycollate or glycollic acid, and further reduction with the Raney nickel to form the 3-indolinyl glycollic acid. After the Raney nickel reduction, the compound thus formed is the glycollic acid; if the ester is desired, the acid may be esterified at this point by normal esterification procedures. For example, the glycollic acid compound may be dissolved in an inert organic solvent and reacted with isobutene or dihydropyran at room temperature or below in the presence of a catalytic amount of acid to form the t-butyl or tetrahydropyranyl ester. The ester may be isolated by quenching the mixture in water containing an equivalent amount of base to neutralize the acid present, and the organic phase separated and concentrated to yield the desired ester. The 3-indoline glycollic acid or ester is then acylated under Shotten-Bauman conditions. If an excess of acylating agent is used (i.e., 2 moles), both the N-1 and the α-hydroxy positions will be acylated. For reasons of economics, however, it is preferred to use equimolar amounts of the acylating agent and indoline compound and thereby acylate the N-1 position only. The acylated glycollic acid or ester is then heated with at least a catalytic amount of a strong acid to form the desired 3-indolyl acetic acid compound. When the esters are used in this last step, the ester function must be one which is easily removed under the conditions described. Suitable esters are t-butyl ester, tetrahydropyranyl ester, and the like.

Referring to the above flow sheet, the process may be further described as follows:

Step 1.—Reduction under hydrogen pressure with Raney nickel in an inert solvent (i.e., such as water, lower alkanols, ethyl acetate, diglyme, dioxane, ether, and the like; if the acid is used, it is preferred to use water as the solvent) under basic conditions (such as alkali and alkali earth hydroxides, carbonates, or bicarbonates) at elevated temperatures (at least 50° C., preferably at or near 100° C.).

Step 2.—Reduction under hydrogen with palladium in an inert solvent such as alcohols, ethyl acetate, and the like or with aluminum amalgam in an inert solvent such as ether, dioxane, alcohols, and the like containing a sufficient amount of a compound capable of donating hydrogen, such as water and alcohols, preferably water.

Step 3.—Same as Step 1.

Step 4.—Acylation with a p-chlorobenzoyl halide or anhydride, preferably p-chlorobenzoyl chloride, with a water-soluble base (such as an alkaline or an alkaline earth hydroxide).

Step 5.—Heating in an inert solvent with at least a catalytic amount of an acid. The reaction is carried out above room temperature, preferably above 50° C. and especially at or near the boiling point of the solvent. Any organic solvent inert to the reaction and capable of sufficiently solubilizing the reactant may be used. Any strong acid may be used in this reaction, such as p-toluenesulfonic acid, methane sulfonic acid, trichloroacetic acid, including strong inorganic acids such as phosphoric, sulfuric and the like.

The following examples are used to illustrate the invention:

Example 1.—Methyl - 2 - methyl - 5 - methoxy - 3-indoleglyoxalate

To a stirred solution of 0.25 mole of 2-methyl-5-methoxyindole in 500 ml. of anhydrous ether at 0° to 5° C. is added 25 ml. (0.29 mole) of oxalylchloride dropwise over 30 minutes. Stiring and cooling is continued for an additional 1 hour, than 25 g. of anhydrous methanol is added over 30 minutes. The solvent is removed in vacuo and the residue recrystallized from methanol to give methyl - 2 - methyl - 5 - methoxy - 3 - indoleglyoxalate.

Similarly, when 2 - methyl - 5 - dimethylaminoindole is used in place of 2-methyl-5-methoxyindole in the above example, there is obtained methyl-2-methyl-5-dimethylamino-3-indolylglyoxalate.

Example 2.—Methyl-2-methyl-5-methoxy-3-indoleglycollate

Thirty grams of aluminum foil is treated for one minute with 10% sodium hydroxide solution and then washed by decantation with several portions of water and a few times with anhydrous ethanol. The foil is then covered with a 2% aqueous mercuric chloride solution for 3 minutes, and the amalgamated aluminum washed with water, ethanol, and finally anhydrous ether.

The aluminum amalgam is then stirred for 5 hours with 123.6 g. (0.5 mole) of methyl-2-methyl-5-methoxy-3-indoleglyoxalate dissolved in 1500 ml. of ether, to which has been added 15 ml. of water and 15 ml. of methanol. After the reduction is completed, the reaction mixture is filtered and the cake extracted with warm acetone. The combined ether and acetone filtrate is concentrated in vacuo and the solid residue recrystallized from acetone to give methyl-2-methyl-5-methoxy-3-indoleglycollate.

Similarly, when methyl-2-methyl-5-dimethylamino-3-indolylglyoxalate, obtained from Example 1, is used in place of methyl-2-methyl-5-methoxy-3-indolylglyoxalate in the above example, there is obtained the corresponding methyl-2-methyl-5-dimethylamino-3-indolylglycollate.

Example 3.—2-methyl-5-methoxy-3-indoline glycollic acid 24.7 grams of methyl-2-methyl-5-methoxy-3-indoleglyoxalate, 5.0 g. of sodium hydroxide in 150 ml. of water and 15 g. of wet Raney nickel are charged to a stainless steel autoclave and rocked under 1000 p.s.i. hydrogen pressure at 80° to 100° C. until the theoretical amount of hydrogen is absorbed. After cooling the autoclave to room temperature and releasing the pressure, the catalyst is removed by filtration. The filtrate is acidified with 2 N hydrochloric acid to a pH of 4.0 to give 2-methyl-5-methoxy-3-indolineglycollic acid.

Similarly, when methyl-2-methy-5-dimethylamino-3-indolylglyoxalate obtained from Example 1 is used in place of methyl-2-methyl-5-methoxy-3-indolylglyoxalate in the above example, there is obtained 2-methyl-5-dimethylamino-3-indolinyl glycollic acid.

Example 4.—2-methyl-5-methoxy-3-indoline glycollic acid 23.4 grams of methyl-2-methyl-5-methoxy-3-indoleglycollate, 4.5 g. of sodium hydroxide in 100 ml. of water and 10 g. of wet Raney nickel are charged to a stainless steel rocking autoclave. The hydrogen pressure is adjusted to 1000–1100 p.s.i. and the mixture rocked at about 80° to 100° C. until the theoretical amount of hydrogen is absorbed. After cooling the autoclave and releasing the pressure, the mixture is filtered to remove the catalyst. The clear filtrate is cooled to 10° C. and acidified with 2 N hydrochloric acid. The precipitated 2-methyl-5-methoxy-3-indoline glycollic acid is filtered, washed with water and dried in vacuo.

Similarly, when methyl-2-methyl-5-dimethylamino-3-indolylglycollate obtained from Example 2 is used in place of methyl-2-methyl-5-methoxy-3-indolylglycollate in the above example, there is obtained 2-methyl-5-dimethylamino-3-indolinyl gylcollic acid.

Example 5.—1-p-chlorobenzoyl-2-methyl-5-methoxy-3-indoline glycollic acid 2-methyl-5-methoxy-3-indoline glycollic acid (11.5 g.) is dissolved in 21 ml. of 12 N sodium hydroxide. p-Chlorobenzoylchloride (18 ml.) is added with vigorous stirring. The solution is kept alkaline through the benzoylation and the temperature is kept at about 40° C. by external cooling. When the p-chlorobenzoylchloride completely reacts, the mixture is cooled to 10° C. and acidified with 5 N hydrochloric acid to a pH of 3.5–4. The crude product is filtered, washed with water and dried in vacuo, after which it is slurried in 100 ml. of methylene chloride. The insoluble material is filtered off (p-chlorobenzoic acid) and the filtrate concentrated in vacuo to dryness to give 1-p-chlorobenzoyl-2-methyl-5-methoxy-3-indoline glycollic acid.

Similarly, when 2-methyl-5-dimethylamino-3-indolinyl glycollic acid is used in place of 2-methyl-5-methoxy-3-indolinyl glycollic acid in the above example, there is obtained 1-p-chlorobenzoyl-2-methyl-5-dimethylamino-3-indolinyl glycollic acid.

Example 6.—1-p-chlorobenzoyl-2-methyl-5-methoxy-3-indole acetic acid

To a three-necked flask, equipped with stirrer and Dean-Stark water separator, is charged 37.5 g. of 1-p - chlorobenzoyl-2-methyl-5-methoxy-3-indole glycollic acid in 300 ml. of benzene, and a solution of 3.0 g. of p-toluenesulfonic acid in 25 ml. of glacial acetic acid. The reaction mixture is refluxed under nitrogen until the theoretical amount of water (1.8 ml.) is collected. The reaction mixture is cooled to 60° C. and washed with 50 ml. of water containing 1.5 g. of sodium acetate and twice with 50 ml. of water. The warm benzene solution is dried over $Na_2SO_4$, filtered while hot and concentrated to 150 ml. in vacuo. The solution is cooled to 10° C. and aged for 1 hour. The crude product is filtered, washed with benzene and recrystallized from tertiary-butanol to yield 1 - p - chlorobenzoyl-2-methyl-5-methoxy-3-indole acetic acid, M.P. 159–160° C.

Similarly, when 1-p-chlorobenzoyl-2-methyl-5-dimethylamino-3-indolyl glycollic acid or t-butyl-1-p-chlorobenzoyl-2-methyl-5-methoxy-3-indolylglycollate is used in the above example, there is obtained the corresponding 3-indolyl acetic acid compounds.

Similarly, when methane sulfuric acid is used in place of p-toluenesulfonic acid and the reaction carried out at 50–60° C. instead of the boiling point of the solvent, there is obtained 1–p-chlorobenzoyl-2-methyl-5-methoxy-3-indolyl acetic acid.

Example 7.—1-p-chlorobenzoyl-2-methyl-5-methoxy-3-indole-glycollic acid-p-chlorobenzoate 2-methyl-5-methoxy-3-indoline glycollic acid (11.5 g.) is dissolved in 40 ml. of 12 N sodium hydroxide. p-Chlorobenzoylchloride (36 ml.) is added dropwise with vigorous stirring over 1 hour at −5° to 0° C. When the p-chlorobenzoylchloride is completely reacted, the mixture is acidified with 5 N hydrochloric acid to a pH of 3.5–4.

The crude product is filtered, washed with water and dried in vacuo, after which it is slurried in 100 ml. of methylene chloride. The insoluble (p-chlorobenzoic acid) is filtered off and the filtrate concentrated in vacuo to dryness to give 1-p-chlorobenzoyl-2-methyl-5-methoxy-3-indoline-glycollic acid-p-chlorobenzoate.

Example 8.—1-p-chlorobenzoyl-2-methyl-5-methoxy-3-indole acetic acid

1 - p - chlorobenzoyl - 2 - methyl - 5 - methoxy - 3 - indoline-glycollic acid-p-chlorobenzoate (25 g.) is refluxed in 300 ml. of xylene containing 2.0 g. of p-toluenesulfonic acid for 3 hours under nitrogen. The mixture is cooled to 60° C. and washed with 50 ml. of water containing 1.5 g. of sodium acetate and then twice with 50 ml. of water. The warm xylene solution is concentrated in vacuo to 100 ml. and cooled to 0° C. The crude product is filtered, washed with xylene and recrystallized from t-butanol to give 1-p-chlorobenzoyl-2-methyl-5-methoxy-3-indole acetic acid, M.P. 159–160° C.

I claim:
1. A process for preparing a 3-indolyl acetic acid compound of the formula

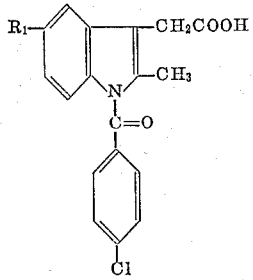

wherein $R_1$ may be methoxy or dimethylamino; which comprises in combination the steps of:
(a) reducing with Raney nickel or with palladium/carbon or aluminum amalgam followed by Raney nickel a glyoxalic acid compound of the formula

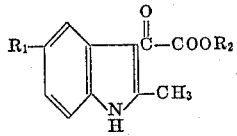

wherein $R_2$ is hydrogen, lower alkyl or tetrahydropyranyl; to form a glycollic acid compound of the formula

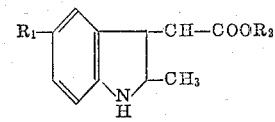

(b) if desired, esterifying with an $R_2$ alcohol said glycollic acid compound to form the corresponding glycollate ester;
(c) admixing said glycollic acid or ester with a p-chlorobenzoyl halide or anhydride under basic conditions to form the corresponding N-1 acyl glycollic acid or ester compound; and
(d) heating said N-1 acyl glycolic acid or ester compound in the presence of at least a catalytic amount of a strong acid to form the desired 3-indolyl acetic acid compound.

2. A process of claim 1 wherein $R_1$ is methoxy and $R_2$ is lower alkyl.

3. A process of claim 1 wherein $R_1$ is dimethylamino and $R_2$ is lower alkyl.

4. A process of claim 1 wherein step (c) is carried out using p-chlorobenzoyl chloride in aqueous sodium hydroxide and step (d) is carried out by heating above 50° C. in the presence of p-toluenesulfonic acid.

5. The process of claim 1 wherein $R_1$ is methoxy, $R_2$ is hydrogen, the reducing agent in step (a) is Raney nickel, step (b) is omitted, the acylating agent in step (c) is p-chlorobenzoyl chloride, and the acid in step (d) is p-toluenesulfonic acid.

References Cited

UNITED STATES PATENTS 3,351,630   1/1966   Shen _____ 260—326.12

NICHOLAS S. RIZZO, *Primary Examiner.*

J. A. NARCAVAGE, *Assistant Examiner.*